US012132283B2

(12) United States Patent
Stearns (10) Patent No.: US 12,132,283 B2
(45) Date of Patent: Oct. 29, 2024

(54) TELEPHONE JACK BRACKET AND MASKING DEVICES FOR MOUNTING ON SAME

(71) Applicant: Donna Stearns, Falmouth, MA (US)

(72) Inventor: Donna Stearns, Falmouth, MA (US)

(*) Notice: Subject to any disclaimer, the term of this patent is extended or adjusted under 35 U.S.C. 154(b) by 683 days.

(21) Appl. No.: 17/399,695

(22) Filed: Aug. 11, 2021

(65) Prior Publication Data

US 2021/0376536 A1 Dec. 2, 2021

Related U.S. Application Data

(63) Continuation-in-part of application No. 17/235,932, filed on Apr. 20, 2021, now abandoned, which is a continuation of application No. 16/674,392, filed on Nov. 5, 2019, now Pat. No. 11,018,460.

(51) Int. Cl.
| | |
|---|---|
| *H01R 13/66* | (2006.01) |
| *F16M 13/02* | (2006.01) |
| *H01R 13/73* | (2006.01) |
| *H01R 24/62* | (2011.01) |
| *H02J 7/00* | (2006.01) |
| *H01R 107/00* | (2006.01) |

(52) U.S. Cl.
CPC ......... *H01R 13/6675* (2013.01); *F16M 13/02* (2013.01); *H01R 13/73* (2013.01); *H01R 24/62* (2013.01); *H02J 7/00* (2013.01); *H02J 7/0045* (2013.01); *H01R 2107/00* (2013.01); *H02J 2207/20* (2020.01)

(58) Field of Classification Search
CPC ..... H01R 13/6675; H01R 13/73; H01R 24/62
USPC .................................................... 439/620.23
See application file for complete search history.

(56) References Cited

U.S. PATENT DOCUMENTS

| | | | |
|---|---|---|---|
| 4,349,706 A * | 9/1982 | Thompson | H04M 1/11 |
| | | | 379/454 |
| 4,425,725 A | 1/1984 | Moustakas | |
| 4,780,573 A | 10/1988 | Own | |
| 4,800,239 A | 1/1989 | Hill | |
| 5,539,821 A | 7/1996 | Blonder | |
| 5,675,125 A | 10/1997 | Hollinger | |
| 5,735,708 A | 4/1998 | Arnett | |
| 6,026,605 A | 2/2000 | Tippett | |
| 6,329,597 B1 * | 12/2001 | Kaloustian | H02G 11/02 |
| | | | 174/67 |

(Continued)

FOREIGN PATENT DOCUMENTS

| | | |
|---|---|---|
| FR | 3 066 654 | 11/2018 |
| WO | 2015128535 | 9/2015 |

*Primary Examiner* — Phuong K Dinh
(74) *Attorney, Agent, or Firm* — Lambert Shortell & Connaughton; David J. Connaughton, Jr.; Justin P. Tinger (57) ABSTRACT

The present disclosure relates to telephone jack covering systems that advantageously render existing telephone jacks more attractive and useful. The systems disclosed include a novel bracket that allows for existing telephone jacks to be covered with decorative and functional devices. In a preferred embodiment, an existing telephone jack is outfitted with a bracket and covered with a converter device that converts the existing telephone jack into a smart device charging station. In yet another preferred embodiment, an existing telephone jack is outfitted with a bracket and covered by a functional masking device that functions as a panic button in case of an emergency.

18 Claims, 11 Drawing Sheets

(56) References Cited

U.S. PATENT DOCUMENTS

| | | |
|---|---|---|
| 7,071,414 B2 | 7/2006 | Kim |
| 7,425,681 B2 | 9/2008 | Xu |
| 7,785,138 B2 | 8/2010 | Bonnassieux |
| 8,542,819 B2 * | 9/2013 | Hazani .................. H04B 3/542 |
| | | 379/413.04 |
| 8,653,364 B2 | 2/2014 | Roban |
| 9,048,647 B2 | 6/2015 | Myers |
| 2008/0030350 A1 * | 2/2008 | Brenner ................. H04L 12/66 |
| | | 455/404.1 |
| 2009/0020307 A1 | 1/2009 | Roach |
| 2009/0126968 A1 | 5/2009 | Glas |
| 2013/0244475 A1 | 9/2013 | Sayadi |
| 2013/0265694 A1 | 10/2013 | Texter |
| 2014/0203757 A1 | 7/2014 | Ibragimova |
| 2014/0362559 A1 | 12/2014 | Chien |
| 2017/0324200 A1 | 11/2017 | Gorin |

* cited by examiner

TELEPHONE JACK BRACKET AND MASKING DEVICES FOR MOUNTING ON SAME

FIELD OF DISCLOSURE

The present disclosure relates to modification of existing telephone jacks, and more specifically, to modifying said jacks to make them more attractive and useful to modem home-owners and renters. In accordance with the disclosure, various telephone jack covers are disclosed that modify the telephone jack to provide advantageous and desirable functions to a user.

BACKGROUND

Most residences are still equipped with telephone jacks. The use of wired telephones have, however, become obsolete in the wake of cell phones. Individuals rarely, if ever, use "land lines," in their residence and instead favor the exclusive use of their cell phones. Telephone jacks are thus mainly considered an unsightly relic of the past and an eye sore to today's modem residents. Most residents would much rather that their telephone jacks, particularly those in visible and high traffic places, simply not exist or be replaced with something more useful. There thus exists a need for a device able to both mask existing telephone jacks and make them useful to modem consumers.

SUMMARY OF DISCLOSURE

The present disclosure relates to systems for covering existing telephone jacks. In accordance with aspects and embodiments a bracket is provided that fits over existing telephone jacks and mates with decorative and functional devices that mask the existing jack.

In accordance with a first aspect, a telephone jack masking system is disclosed comprising a telephone jack fixed to a wall by a telephone jack covering, a bracket attached to the telephone jack covering; a masking device attached to the bracket and having a front face and a back, the front face having one of a decorative feature, a functional feature, or a combination thereof. In accordance with embodiments, the masking device may include a decorative feature including but not limited to a picture frame, a piece of art, or a mirror. In accordance with embodiments, the masking device may include a functional feature, including hut not limited to one or more shelves, one or more hooks, one or more file folders, a jewelry or accessory holder, or a cork board, white board, or other message board. In accordance with other embodiments, the masking device may include a combination of decorative and functional features.

In accordance with embodiments, the telephone jack coverings may be fixed to the wall by a pair of screws that pass through a set of holes in the covering, and the brackets of the disclosure may have a corresponding set of through holes that align with the junction box holes. This may advantageously allow the brackets of the disclosure to be fixed to the telephone jack coverings without having to form additional holes in the wall surrounding the telephone jack.

The brackets of the present disclosure may further define a telephone jack frame between the bracket through holes such that when installed on the telephone jack covering, the telephone jack is unobstructed. The brackets may further comprise mounting fingers and the bracket mounting lingers may engage with a corresponding mounting hook of the masking devices of the disclosure. The masking devices contemplated by the disclosure may include a stabilization arm to ensure the devices remain a fixed distance from the bracket and or wall.

In accordance with aspects and embodiments, a telephone jack charging system is disclosed, the system comprising a telephone jack fixed to a wall by a telephone jack covering, a bracket attached to the telephone jack covering, and a converter device attached to the bracket, where the converter device has a front face and a back face, and the back face has extending therefrom a telephone plug plugged into the telephone jack and the front face has a female USB port. In accordance with embodiments, the converter device comprises a voltage converter that converters voltage in the telephone jack line to current usable by a device plugged into the USB port. In accordance with aspects and embodiments, the converter device further comprises a shelf that extends from the front face and where a smart device can be stored while being charged.

In accordance with further aspects and embodiments, a functional telephone jack masking system is disclosed, the system comprising a telephone jack and a wall plate, a bracket connected to the wall plate, and a masking device connected to the bracket, wherein the masking device comprises a panic button.

The wall plate of the present disclosure may have a width and may surround the telephone jack. The bracket of the present disclosure may define a jack frame, and the telephone jack may be accessible through the jack frame when the bracket contacts the wall plate. The masking device may comprise a front cover hingedly connected to the masking device and two side latches for engaging with the bracket.

DETAILED DESCRIPTION

The present disclosure relates to devices for covering and modifying existing telephone jacks. The telephone jacks covered and modified by the devices of the present disclosure may be located in any type of building, and may for example be in a residence, but the devices disclosed herein are suitable for telephone jacks in office and commercial spaces.

Telephone jacks may exist in a variety of configurations, including for example, jacks that are substantially flush with the wall and jacks that are in boxes protruding from the wall. The jacks themselves are fixed to the wall by telephone jack coverings, and these coverings may for example he wall plates or junction boxes, these coverings are further fixed to the wall by screws that pass through the covering and into the wall. Though jack configurations may vary, the jacks themselves are standardized, and most jacks receive a standard telephone plug. The most commonly used plug is an RJ11 modulator connector.

Figure 1:
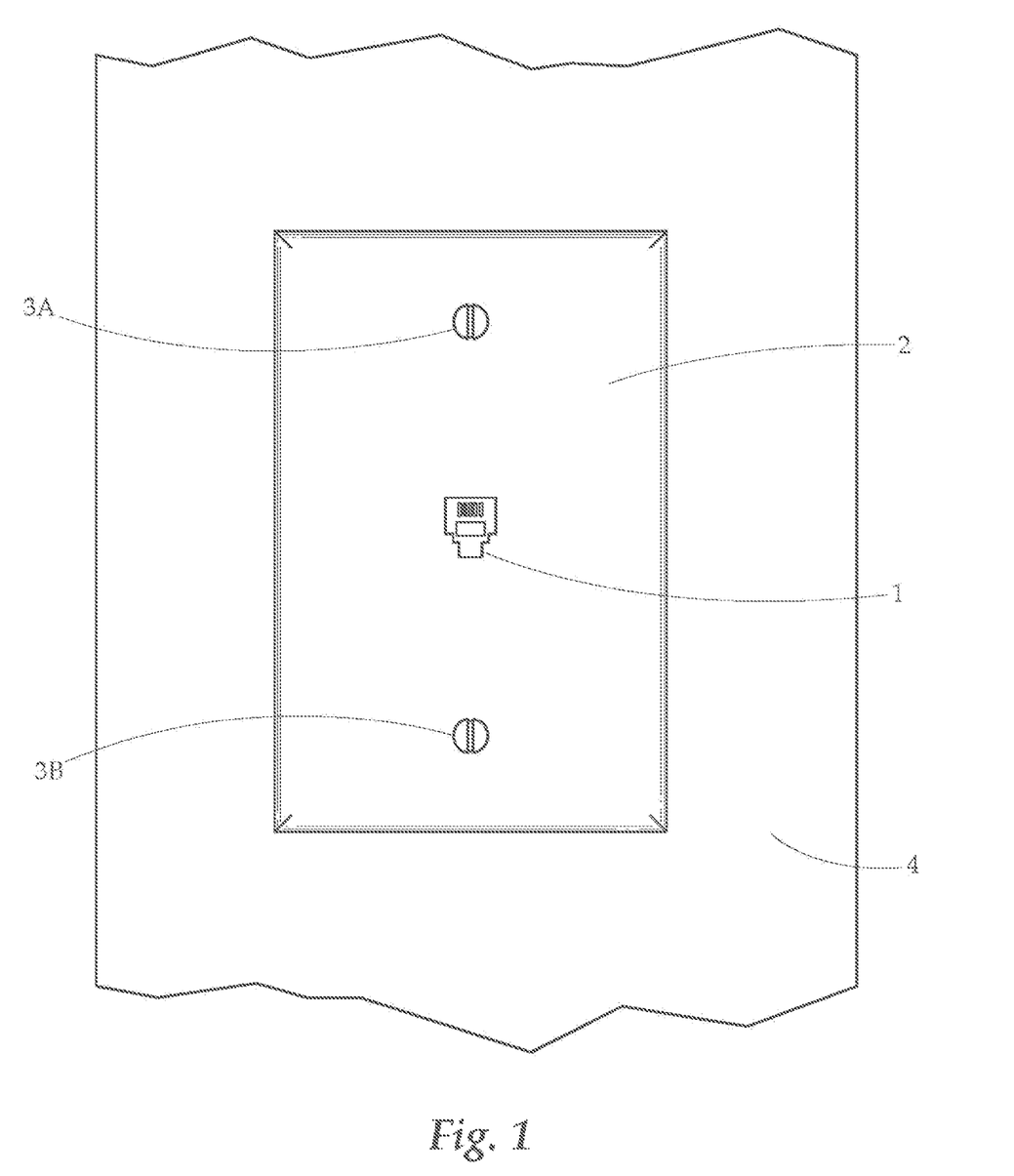
FIG. 1 is a front view of an existing telephone jack configuration.

Turning now to FIG. 1, which shows a telephone jack configuration substantially flush with a surrounding wall. The telephone jack 1 is surrounded by wall plate 2, which is fixed on wall 4 by screws 3A that pass through wall plate 2 through holes 3B and into wall 4.

Figure 2:
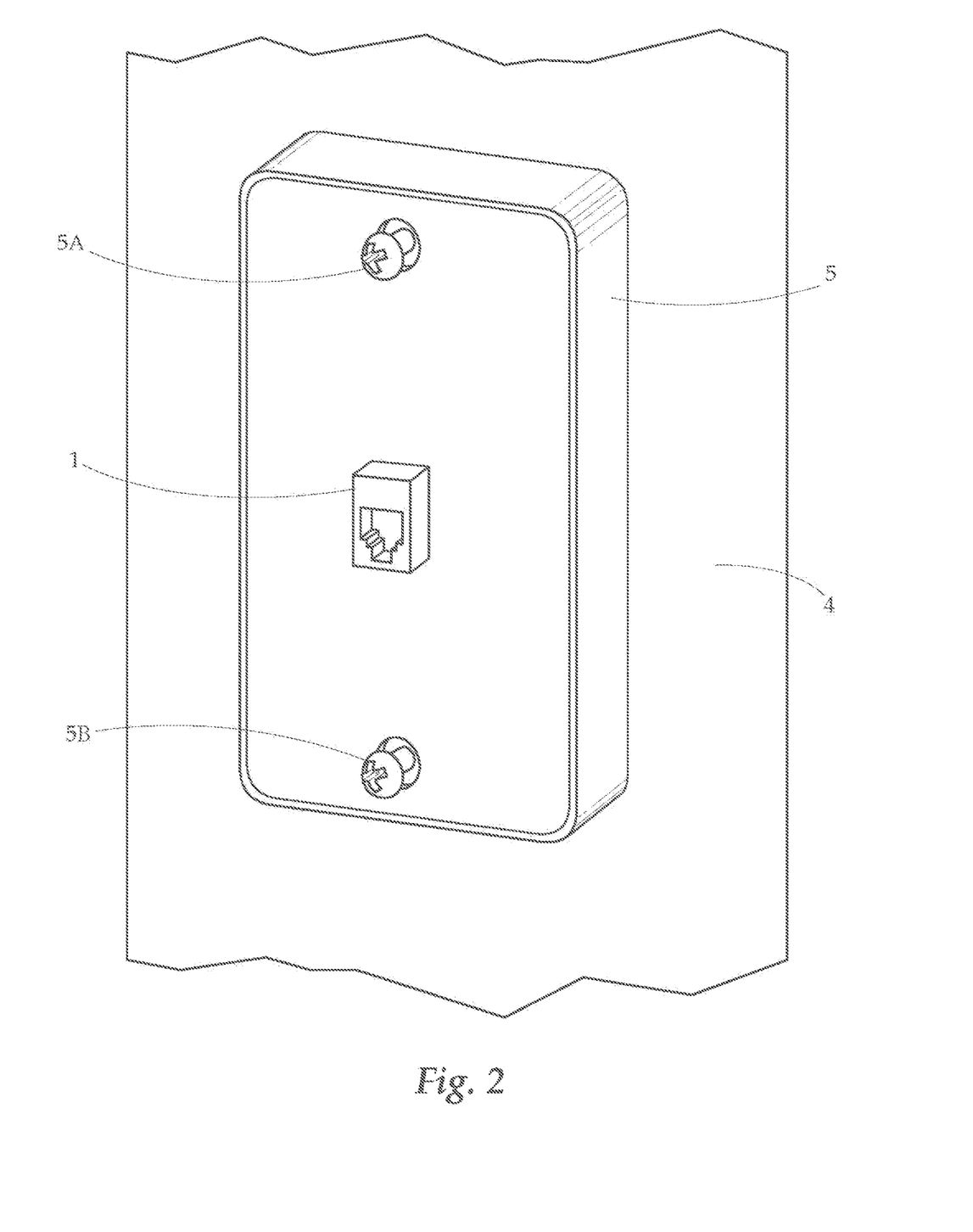
FIG. 2 is a side view of on existing telephone jack configuration.

FIG. 2 shows a telephone jack configuration that protrudes from the wall. The configuration shown in FIG. 2 is often associated with older telephone jacks and thus older construction and older homes. Telephone jack 1 is in junction box 5. Box 5 is affixed to wall 4 with junction box screws 5A that pass through junction box holes 5B.

In another aspect of the disclosure, a bracket is disclosed that is configured to fit over junction box 5. The bracket that fits over junction box 5 can then be used to hang any number of masking devices having decorative and functional features. The bracket that fits over junction box 5 may define a jack frame 15 that may comprise an area equal to or greater than the area of the junction box 5A that the bracket may slide over junction box 5. The bracket that fits over junction box 5 may be attached to the wall 4 by nails or screws through holes 20A, 20B, or 20C defined in the bracket.

Figures 3A, 3B:
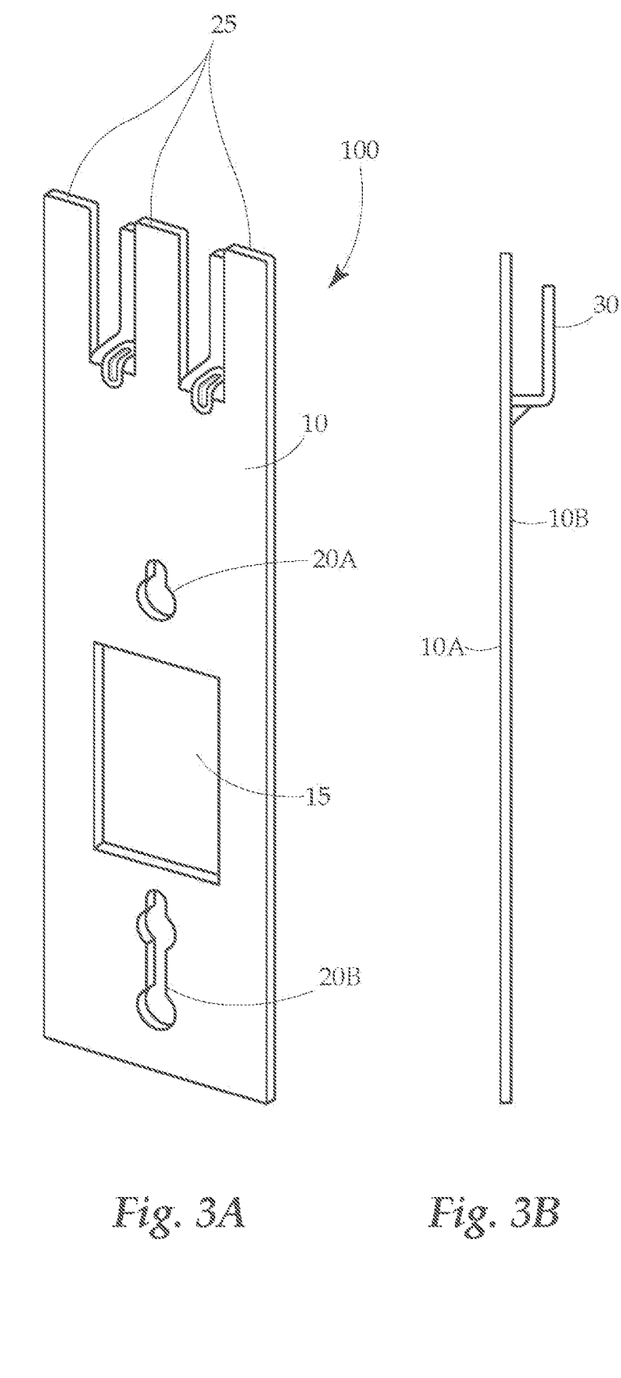
FIG. 3A is a side view of a bracket in accordance with aspects and embodiments.
FIG. 3B is a profile view of a bracket in accordance with aspects and embodiments.
Figure 3C:
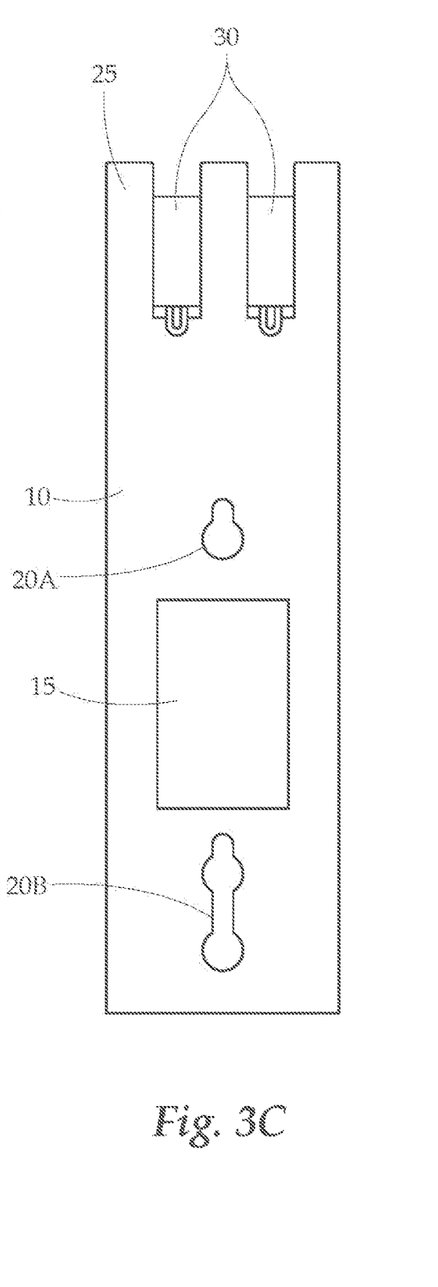
FIG. 3C is a front view of a bracket in accordance with aspects and embodiments.

Referring to FIGS. 3A-3C. bracket 100 is disclosed. Bracket 100 has a plate body 10 having a top end having mounting fingers 25 opposite a bottom end. Plate body 10 has a front face 10A mid a back face 10B. Plate body 10 has through holes 20A and 20B positioned above and below jack frame 15, respectively, will through hole 20B positioned proximate the bottom end of plate body 10. Bracket 100 has mounting arms 30 that extend from back face 10B of plate body 10 at substantially a right angle.

Mounting arms 30 extend from the back face 10B of plate body 10 a distance substantially equal to that of a standard telephone junction box that protrudes from a wall, for example, the configuration of a telephone jack shown in FIG. 2. Through holes 20A and 20B align with junction box holes 5B and telephone jack frame 15 aligns with junction box 5 and telephone jack 1 such that plate body 10 of bracket 100 can sit flush on junction box 5 with mounting arms 30 contacting wall 4.

Figure 4:
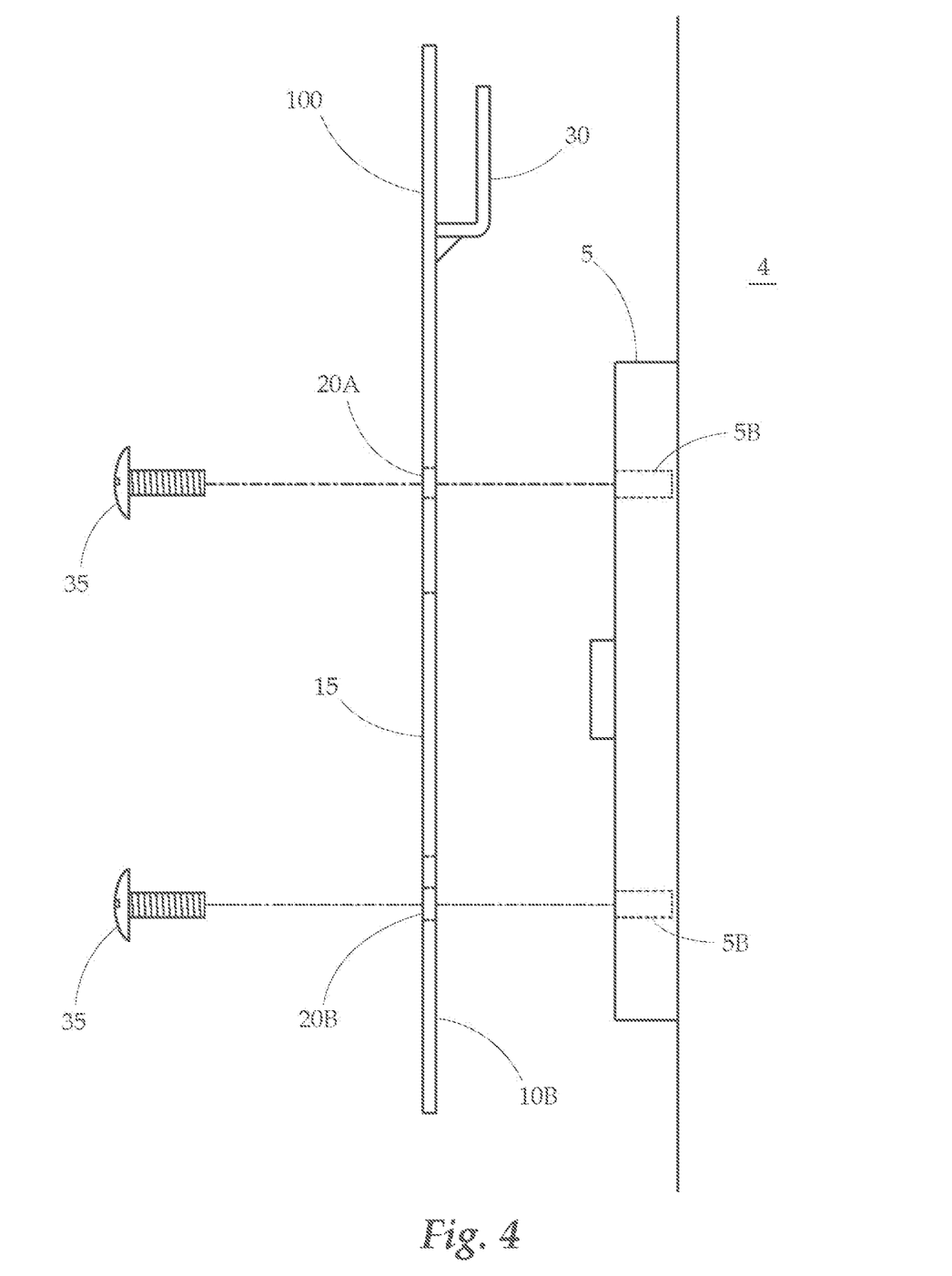
FIG. 4 is an exploded side view of a bracket installed on an existing telephone jack in accordance with aspects and embodiments.

Referring now to FIG. 4, mounting bracket 100 can be fixed to wall 4 and over junction box 5. In a first step, screws 5A are removed, exposing junction box holes 5B. Bracket 100 is positional over junction box 5 such that back face 10B of plate body 10 is flush with junction box 5 and through holes 20A and 20B are aligned with junction box holes 5B. The vertical components of mounting arms 30 sit flush with wall 4. Fixing screws 35 pass through the front face 10A of plate body 10 via through holes 20A and 20B, through plate body 10, into junction box 5 through holes 5B, and into wall 4, securing bracket 100 to wall 4 via junction box 5. Through holes 20A and 20B may be larger than the junction box holes 5B. For example and as shown in FIG. 4, through hole 20B has an oblong shape. The extended shape of through hole 20B thus allows bracket 100 to be affixed to a variety of junction boxes. The shape of through holes 20A and 20B may therefore facilitate the affixing of bracket 100 onto junction boxes of various eras having junction box holes 5B spaced from one another in a variety of distances.

Bracket 100 thus advantageously mounts to telephone jacks via wall coverings without having In make holes into the surrounding wall. If only a single screw is present in a given telephone jack covering, a single bracket fixing screw can be used, and a second fixing screw can be fixed into the wall, if necessary. Configurations of bracket 100 may be further varied to accommodate different geometries of different telephone jack coverings.

Still referring to FIG. 4. telephone jack frame 15 of bracket 100 surrounds telephone jack 1 and leaves telephone jack 1 unobstructed by bracket 100. Bracket 100 can also be used over a telephone jack that is substantially flush with the wall having an identical manner as shown in FIG. 4, on for example, the configuration shown in FIG. 1. The degree to which bracket arms 30 extends perpendicularly from back face 10B may be varied to accommodate different types of telephone jack wall coverings. Additionally, when bracket 100 is being used over a flush junction box, bracket 100 can be such that fingers 25 protrude outwardly and mounting arms 30 are flush with the wall. Alternatively, the orientation of bracket 100 may be reversed when being fixed to the wall such that back face 10B having arms 30 faces away from the telephone jack covering.

Figure 5:
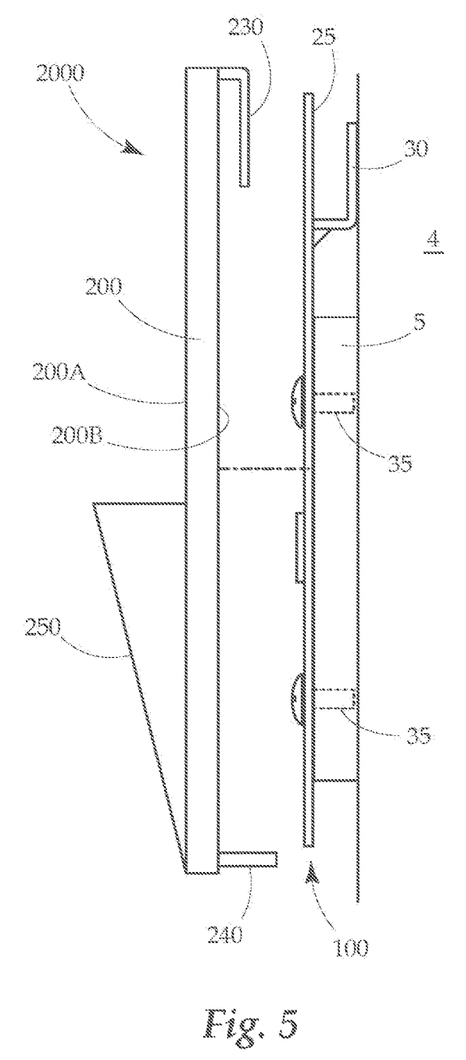
FIG. 5 is an exploded side view of a masking device installed on a bracket installed on an existing telephone jack in accordance with aspects and embodiments.

Referring to FIG. 5, once bracket 100 is installed, a masking device can be mounted on bracket 100 via finger 25. Masking device 2000 has main body 200 having front face 200A and back face 200B. Masking device 2000 has mounting hook 230 that extends from the back face 200B at the top of body 200 that has a corresponding and inverse geometry to the space defined by mounting fingers 25 and mounting arms 30 of bracket 100. Mounting hook 230, when mounted on bracket 100, hooks onto mounting fingers 25. Masking device 2000 may comprise more than one mounting hook 230. Masking device 2000 may further include stabilizing arm 240 that extends from the back face 200B of main body 200 to keep masking device 2000 at a fixed distance from bracket 100 or wall 4. Device 2000 may include more than one stabilizing arm 240 and stabilizing arm 240 may extend from a position towards the bottom end of main body 200 opposite the end from which mounting hook 230 is located.

Masking devices 2000 of the present disclosure may include mounting tubes that, individually receive mounting arms 30 and/or fingers 25, depending on the orientation of mounting of bracket 100. The mounting portion of masking device 2000 may for example span a portion or the entire width of device 2000. The mounting portion may include several mounting tubes positioned in parallel to one another. The tubes may take the form of slots that closely mirror the size and shape of mounting arms 30 fingers 25. When device 2000 is mounted on bracket 100, only certain successive mounting tubes will receive mounting arms 30 fingers 25.

This mounting feature enables device 2000 to be mounted on bracket 100 such that junction box 5 is not centered behind device 2000. For example, device 2000 may be mounted on bracket 100 at a far left or right, while still being held straight up and down by the mounting arms 30/fingers 25 winch are engaged with the mounting tubes at the far left or right This facilitates the positioning of mounting; device 2000 on wall 4 in a variety of configurations and ensures that mounting device 2000 can be positioned in a manner that is most aesthetically pleasing and/or most accessible.

Accordingly, a masking device comprising a body defining a plurality of mounting tubes positioned in parallel to one another is also disclosed. In this embodiment the body of the masking device may be a rectangular board having a length a width, and a depth, wherein the board may be comprised of any material, such as, for example, wood or metal. The width of the masking device may he any width necessary to mount a functional or decorative feature or device on the masking device mounted on the bracket 100. In this embodiment, the bracket 100 may be mounted directly to a wall, and the functional device and decorative feature mounted to the masking device may be a, for example, a television or a picture frame, respectively.

Returning to masking device 2000, which may include on front face 200A a decorative feature including but not limited to a picture frame, a piece of art, a mirror, or any other non-functional feature designed lo enhance the aesthetic appeal of the telephone jack the decor of the room in which it is located. Alternatively, Masking device 2000 may include on front face 200A a functional feature including but not limited to a file folder, a shelf, a hook or plurality of hooks, a jewelry or accessory holder, a magnetic board, a cork board, a white board or other message board, or any feature or set of features selected to provide a user with a desired functionality, for example and as shown in FIG. 5. masking device 2000 includes on front face 200A a file folder 250. File folder 250 may, for example, be used for storing and sorting mail, receipts, and other paperwork.

Masking device 2000 may, in accordance with embodiments, include combinations of both decorative mid functional features. In a non-limiting example, masking device 2000 may have a file folder, shelf, and hooks extending from surface 200A that may be used to sort mail, hold small items, and store keys. Masking device 2000 may further include on front face 200A a mirror or picture frame, as well. It will be appreciated by those of skill in the art that masking device 2000 can include any number of decorative and functional features without departing from the spirit and scope of die disclosure. These features may be selected by the user based in part on where the telephone jack the user seeks to mask is located. For example, a user masking a telephone jack in a kitchen may mask the jack with a device 2000 having a corkboard on front face 2000A suitable tor pinning recipes. A user masking a telephone jack an eye level in their entry way may select a device 2000 having features suitable for mail sorting, and a user masking a telephone jack, that is largely inaccessible may select a device 2000 with a purely decorative art piece on outer surface 200A.

In accordance with further aspect, a system is disclosed for converting a standard telephone jack into a system having a mounting bracket and masking device, where the masking device draws power. For example, in accordance with embodiments, a system is disclosed for converted a standard telephone jack into a USB charging port for a smart device. Alternatively, the jack may be used to power any other device, for example and including a small light, The light may, for example, be used as a nightlight or to illuminate an area not otherwise well-lit. In some embodiments, masking devices that convert standard telephone jacks into a power sources may be decorative and make use of the power source. A masking device may for example include a decorative feature, for example and including a piece of artwork, and may also include a powered feature, for example and including a light that is powered by the jack and illuminates the artwork.

Phone jacks receive power through dedicated wires. When the jack, is not in use, i.e., a phone is not plugged into it and the number assigned to the phone jack is not receiving a call, the jack receives a constant direct current signal of about 50-60 volts. When a telephone line receives a telephone call the signal is about 20 hertz AC. Smartphones, for example, requires about 5 volts to charge, and thus the voltage that runs through a phone jack provides more than enough electricity to charge a smart phone. By reducing the voltage output of the phone line with a voltage regulator, the telephone jack can be converted into a suitable charging station for a smart device. In some embodiments, the voltage regulator may include additional components, including for example a diode, to ensure that the converter is able to handle the AC signal incurred by the line if an incoming call is received.

Figure 6:
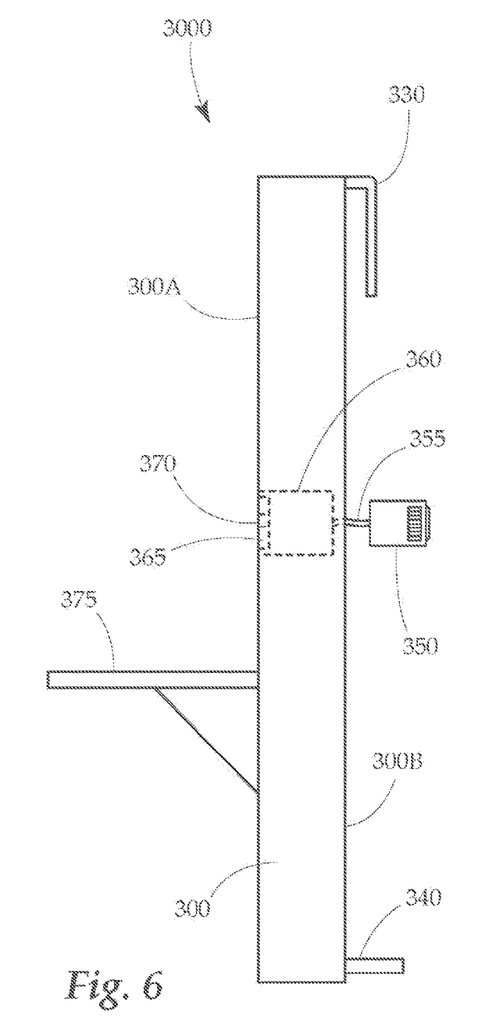
FIG. 6 is a side view of a converter masking device in accordance with aspects and embodiments.

Referring to FIG. 6, a converter masking device 3000 is shown. Converter masking device 3000 has main body 300 having front face 300A and back face 300B. Main body 300 has at its top end mounting hook 330 for mounting on a bracket and main body 300 has at its bottom end stabilizing arm 310 to keep device 3000 at a fixed distance from either a bracket or the wall. Device 3000 has extending from the back face 300B of main body 300 telephone plug 350. Telephone plug 350 is connected to converter box 360 via wire 355. Converter box 360 is encased in main body 300. Converter 360 may, for example, be a voltage converter. Converter 360 is in electrical communication with USB adapter 365. USB adapter 365 is also fully encased in main body 300 but has female USB port 370 on the surface of 300A. Voltage converter 360 may include resistors and diodes and any other electrical components necessary to ensure proper and safe charging of a device plugged into USB port 365. Voltage converter 360 may convert the voltage traveling through the phone line into any desired voltage. Different devices may require different voltages for charging and converter 360 may be selected based on needs of the end user. Device 3000 may further include shelf 375 that extends from front surface 300A of main body 300 that may, for example, be used to store a smart device when being charged via USB port 365.

Figure 7:
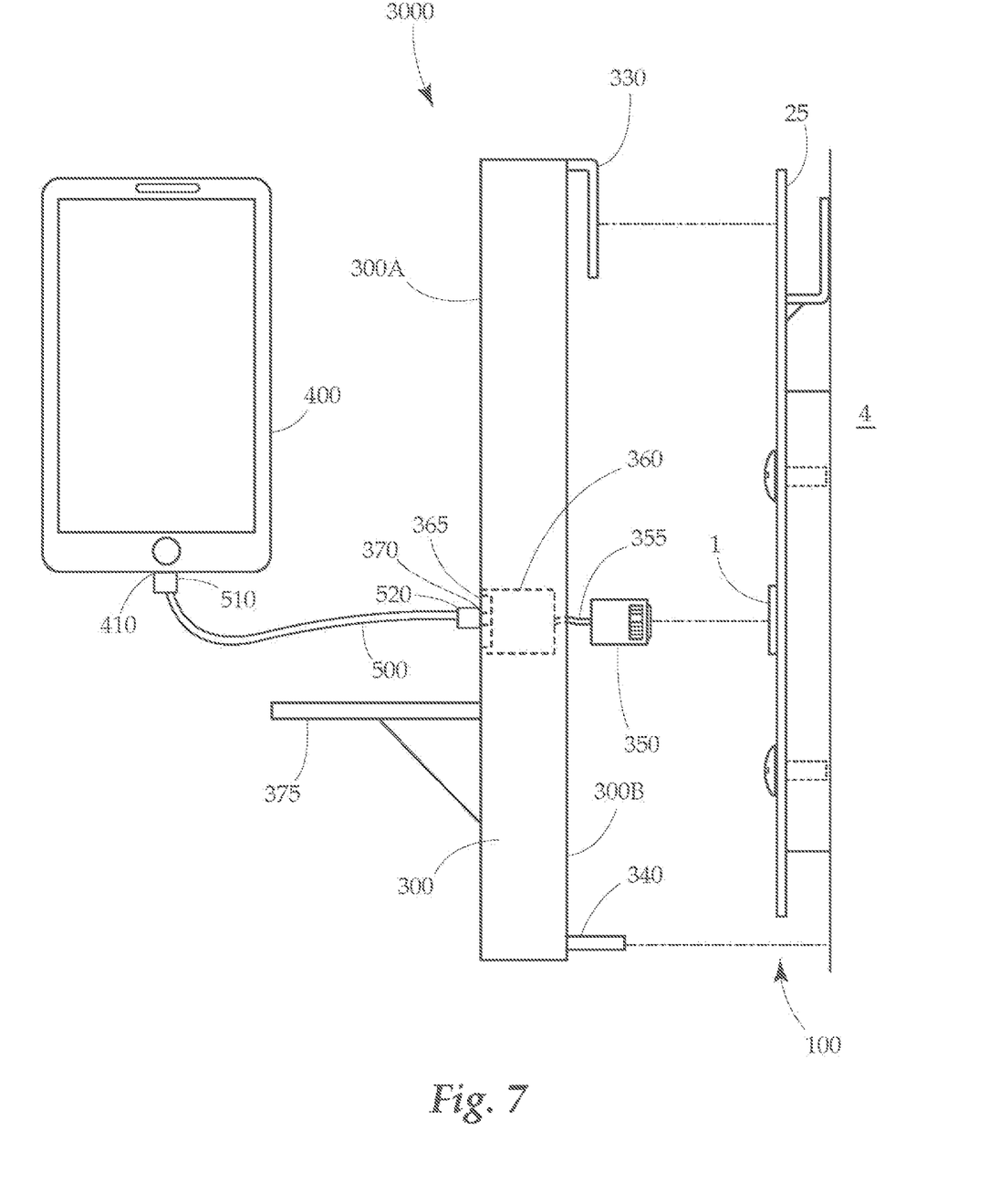
FIG. 7 is an exploded side view of a smartphone connected to converter masking device masking device in in accordance with aspects and embodiments.

When installed and in operation, and turning to FIG. 7, converter masking device 3000 engages with both telephone jack 1 and bracket 100. Bracket 100 connects to box 5 via screw holes 5B and is fixed to box 5 via fixing screws 35 that pass through 20A and 20B, through box 5 and into wall 5. Telephone jack frame 15 of bracket 100 leaves telephone jack 1 unobstructed by bracket 100. Telephone plug 350 of converter masking device 3000 plugs into telephone jack 1. Converter device 3000 then hooks onto bracket 100 via mounting hook 330. Mounting hook 330 engages with mounting fingers 25 of bracket 100. Stabilizing arm 340 abuts wall 4, ensuring device 3000 stays positioned a fixed distance from wall 4.

Smartphone 400 is then charged via converter masking device 3000. USB cable 500 having an end 510 compatible with smart phone charging port 410 is connected to smartphone 400 by smartphone charging port 410. USB cord 500 having male USB end 520 is then inserted into female USB port 370. Converter 360 converts current from the lines of telephone jack 1 into usable current for USB charging, enabling smartphone 400 to charge. Smartphone 400 rests on shelf 375 while charging.

In accordance with yet another aspect, a telephone jack masking system is disclosed for converting a standard telephone jack into a functional masking device and bracket system having a panic button 275 operable to call 911 or another pre-programmed emergency number in the event of an emergency, such as, for example, an emergency service company. In a preferred embodiment, the pressing of the panic button 275 establishes a two-way voice communication with a 911 operator or an emergency service provider through the phone line. In such an embodiment, the two-way voice communication is established via the speaker 270 and the microphone 265 inside the masking device 2001 being connected to the phone line through a telephone jack 1. In another embodiment, the pressing of the panic button 275 may not establish a two-way voice communication. In this alternative embodiment, the pressing of the panic button 275 may send a one-way message to the 911 operator or emergency service provider that the panic button has been pressed 275.

Figure 8:
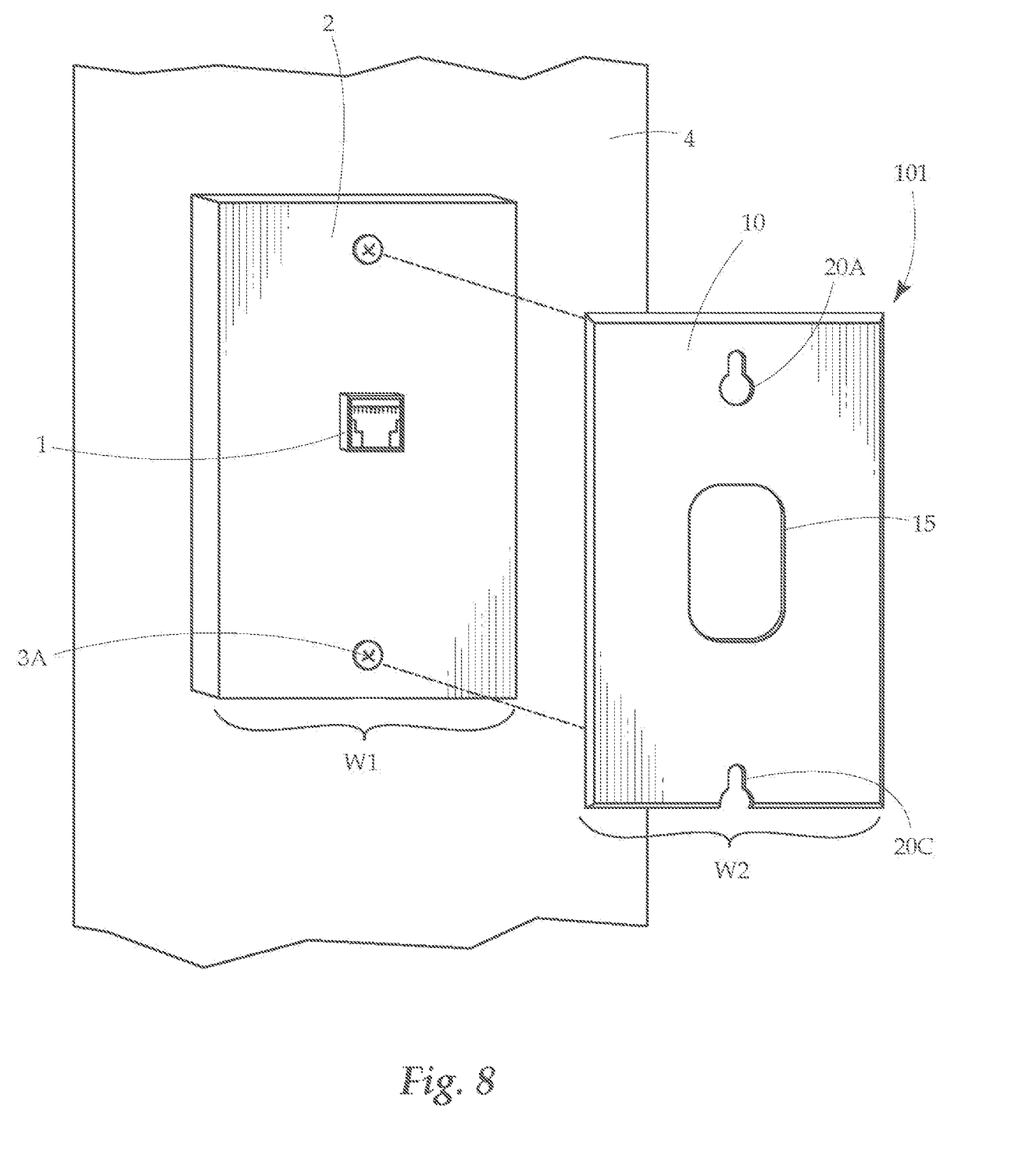
FIG. 8 is an angled side view of a bracket lined up with an existing wall plate in accordance with aspects and embodiments.

Referring to FIG. 8, a bracket 101 is disclosed comprising a plate body 10 having a width W2, which, in the embodiment shown, is greater than the width W1 of the wall plate 2. The bracket 101 may define a jack frame 15 with through holes 20A and 20C positioned above and below the jack frame 15, respectively. The jack frame 15 is located on the plate body 10 in a position that allows the telephone jack 1 to be accessible when the bracket 101 contacts the wall plate 2 that is secured to the wall 4 by screws 3A. In this embodiment, the jack frame 15 is located in the center of the plate body 10 of the bracket 101. When the bracket 101 is being installed over wall plate 2, through holes 20A and 20C align with screws 3A. Screws 3A may be used to fix bracket 101 to the wall plate 2 as an alternative to fixing screws 35 that may be used in other embodiments.

Figure 9:
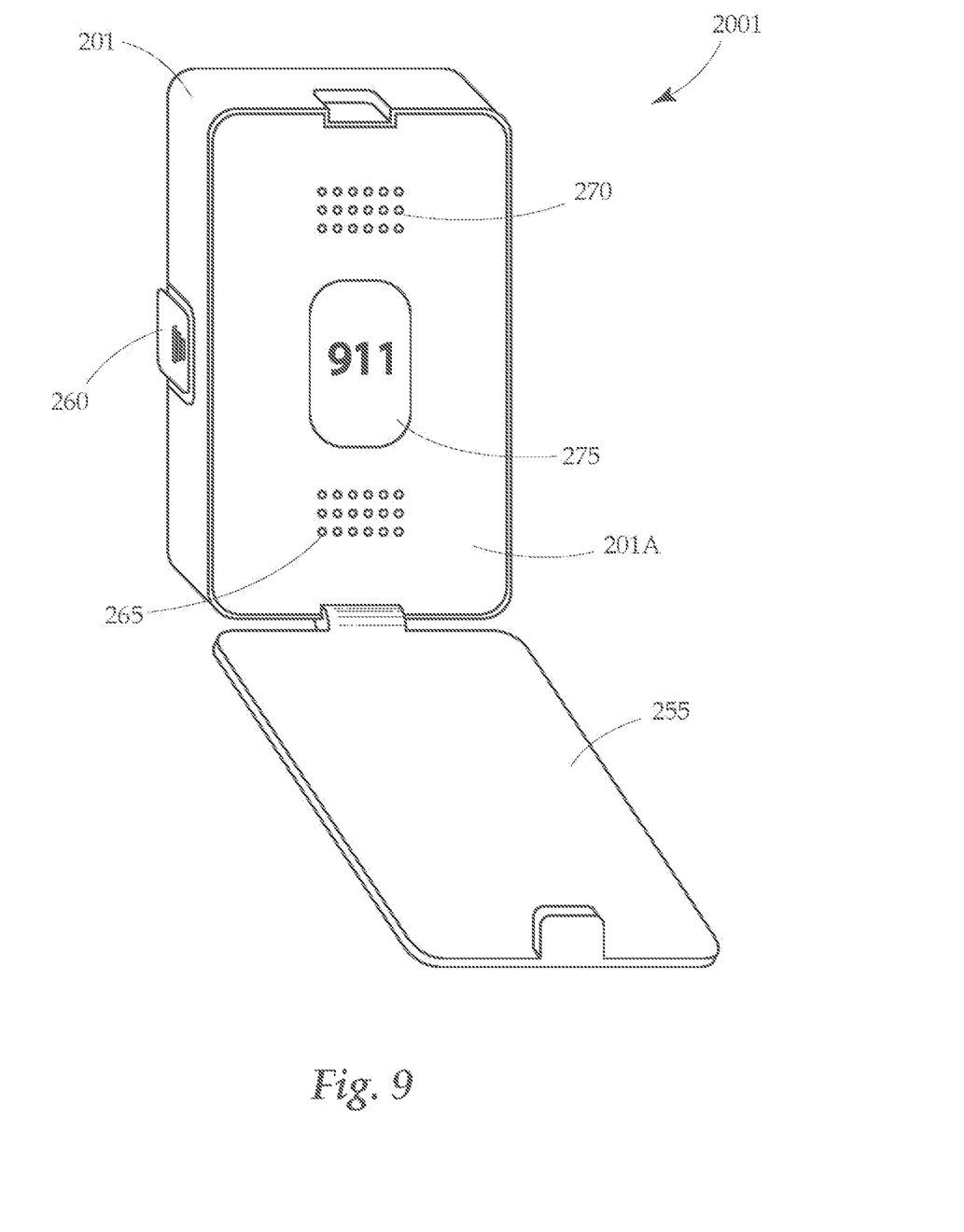
FIG. 9 is a front view of a panic button masking device in accordance with aspects and embodiments.

FIG. 9 shows a masking device 2001 comprising a functional panic button 275 feature. The masking device 2001 has a main body 201, which comprises a panic button 275 on a front face 201A of the main body 201. In the embodiment shown, the front face 201A of the main body 201 also comprises a front cover 255 hingedly connected to the masking device 2001. The front face 201A also comprises grilles, which in the embodiment shown, are positioned above and below the panic button 275. The grilles allow sound waves to effectively and audibly propagate out of and into the main body 201 of the masking device 2001. More specifically, the grilles allow sound waves emitted from a speaker 270 to easily pass through the main body 201. The grilles also allow sound waves from the voice of a user to easily pass through the main body 201 and be picked up by a microphone 265 within the main body 201 of the masking device 2001. The main body 201 of the masking device 2001 also comprises at least two side latches 260, which engage with the bracket 101 when the masking device 2001 is fixed to the plate body 10 of the bracket 101.

Figure 10:
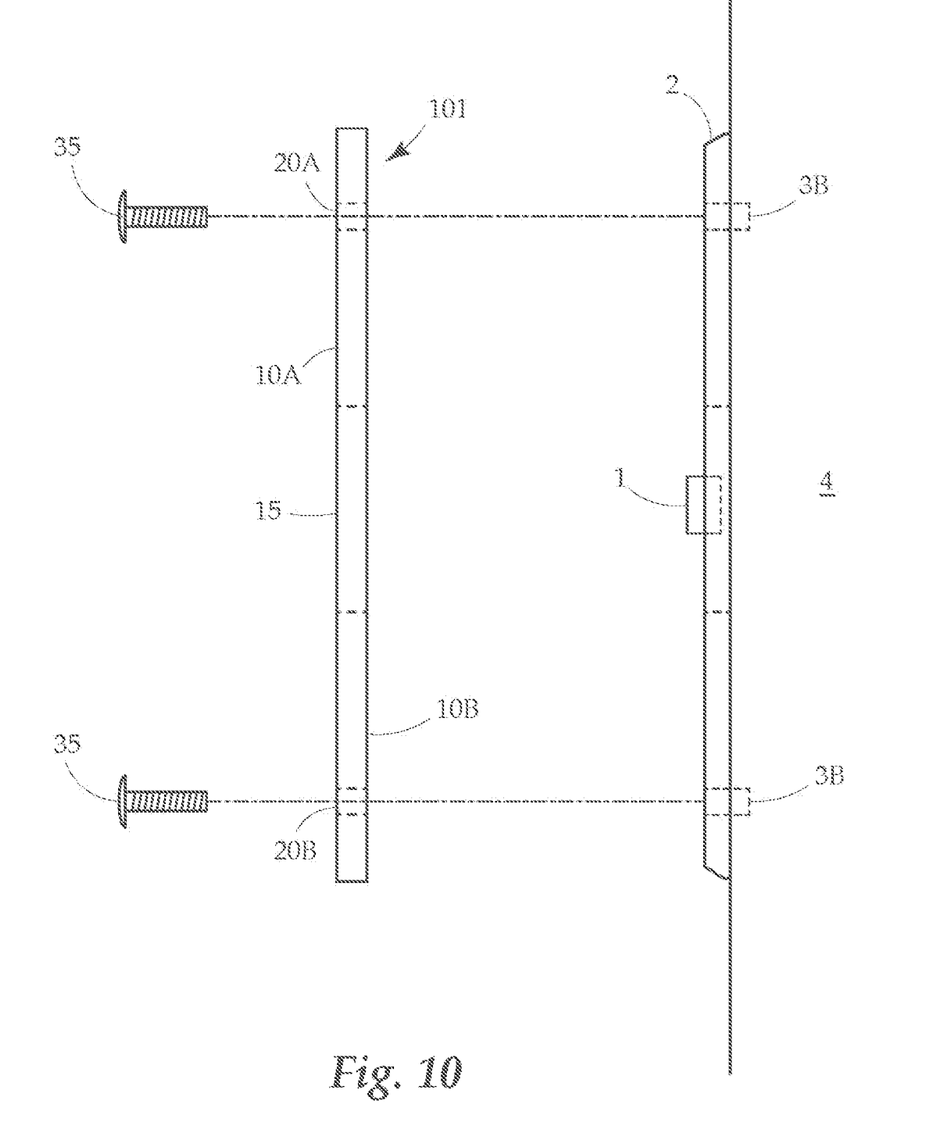
FIG. 10 is a partially exploded side view of a bracket being installed on an existing wall plate in accordance with aspects and embodiments.

FIG. 10 shows an embodiment of the bracket 101 being fixed to the wall plate 2 by fixing screws 35. In this embodiment, the fixing screws 35 pass through the front face 10A of the bracket 101 via through holes 20A mid 20B. When the back face 10B of the bracket contacts the wall plate 2, the fixing screws pass through holes 3B, thus fixing the bracket 101 to the wall plate 2, which is fixed to a wall 4. In this embodiment, when the bracket 101 is fixed to the wall plate 2, the telephone jack frame 15 aligns with the telephone jack 1 so that the telephone jack 1 is accessible through the bracket 101 via the telephone jack frame 15.

Figure 11:
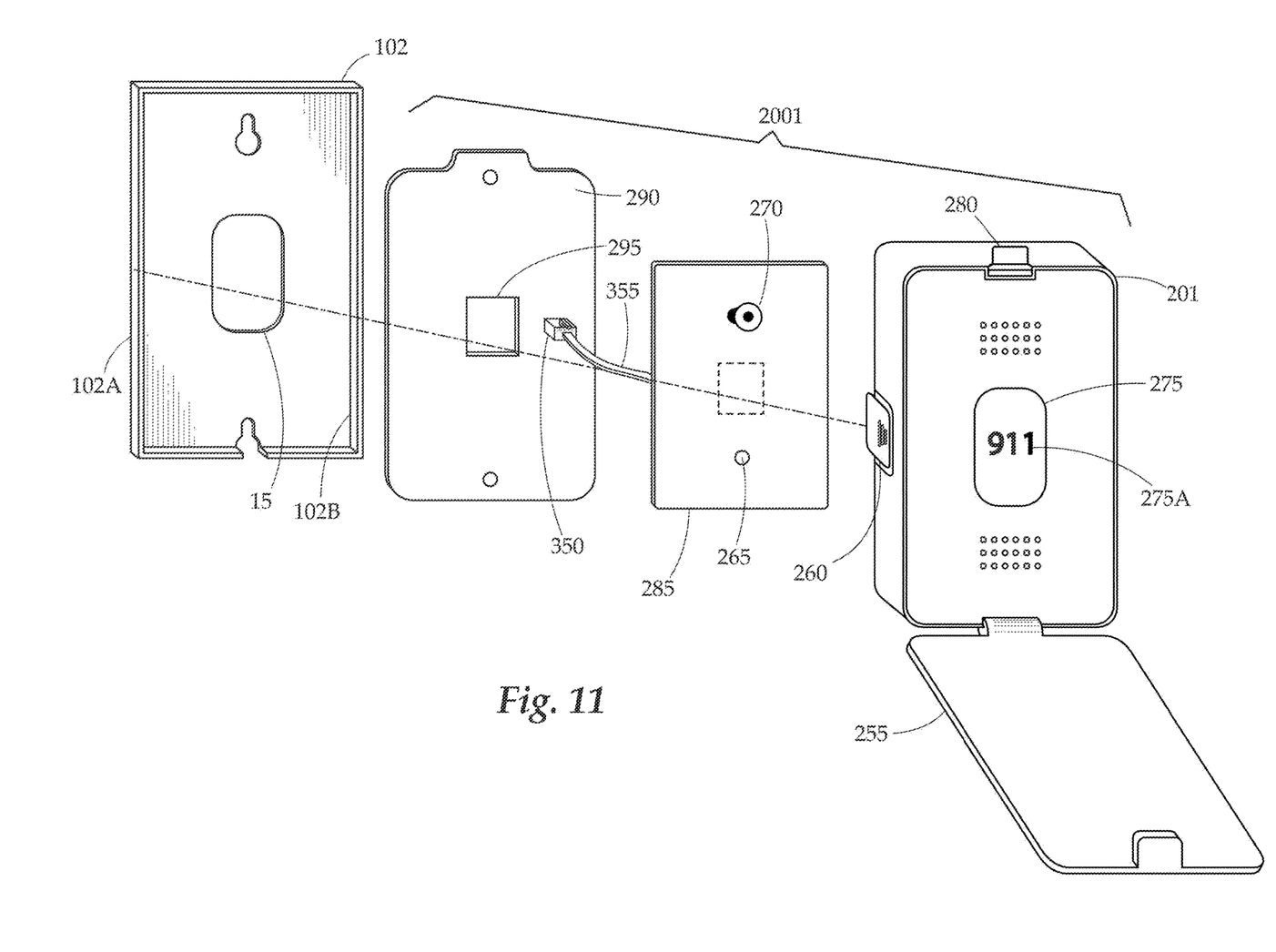
FIG. 11 is a partially exploded side view of a panic button masking device being installed on a bracket in accordance with aspects and embodiments.

FIG. 11 shows a partially exploded embodiment of the masking device 2001 aligning with the bracket 102. In this embodiment, the masking device 2001 comprises a main body 201 connected to a back cover 290, wherein the masking device 2001 has a printed circuit board 285 between the main body 201 and the back cover 290. The speaker 270 and the microphone 265 are electrically connected to the printed circuit board 285. A telephone plug 350 is also connected to the printed circuit board 285 by a wire 355. In this embodiment, when the masking device 2001 is connected to the bracket 102, the telephone plug 350 and wire 355 pass through a wire opening 295 defined in the back cover 290 of the masking device 2001. In this embodiment, the telephone plug 350 and wire 355 are accessible via the wire opening 295, which allows the telephone plug 350 to be connected to a telephone jack 1, which is accessible via the telephone jack frame 15 in the bracket 102.

In the embodiment shown in FIG. 11, the bracket 102 may be connected to the masking device 2001 by engaging with the side latches 260 on the main body 201. In this embodiment, the bracket 102 comprises a protuberance 102A, which defines an indent 102B for engaging with at least the side latches 260 of the main body 201. In this embodiment, the side latches 260 engage with the bracket 102 by clipping into the indent 102D. In other embodiments, the side latches 260 engage with the bracket 101 by clipping onto the edges 101A (shown in FIG. 12) of the bracket 101. In these embodiments, the bracket 101 has a greater width W2 (shown in FIG. 8) than the width W1 of the wall plate 2 (shown in FIG. 8), which allows the side latches 260 to clip onto the edges 101A (shown in FIG. 12) of the bracket 101 without necessarily contacting the wall 4 (shown in FIG. 12). In both types of embodiments, the side latches 260 are pinched to release the masking device 2001 from the bracket 101 or 102.

The embodiment of the main body 201, shown in FIG. 11, also comprises a top latch 280, which, in this embodiment, is pinched to release the front, cover 255 to give the user access to the panic button 275. In this embodiment, the panic button 275 comprises text 275A indicating the number or service that will be contacted when the button 275 is pressed. In some embodiments, the text 275A may comprise lighting to illuminate the text 275A. In preferred embodiments that utilize illuminated text 275A, the lighting may have a light emitting diode source. The masking device 2001 may also comprise other lighting, such as a night light, in order to illuminate the area around the masking device 2001.

In other embodiments, the masking device 2001 comprises additional components within the main body 201 that are connected to the printed circuit board 285. For example, in some embodiments, the masking device 2001 comprises a hook switch and or a duplex coil, or functional equivalents. In other embodiments, the masking device 2001 also comprises a diode or another similar functional equivalent that prevents the masking device 2001 from receiving a call through its connection with the telephone jack 1.

Figure 12:
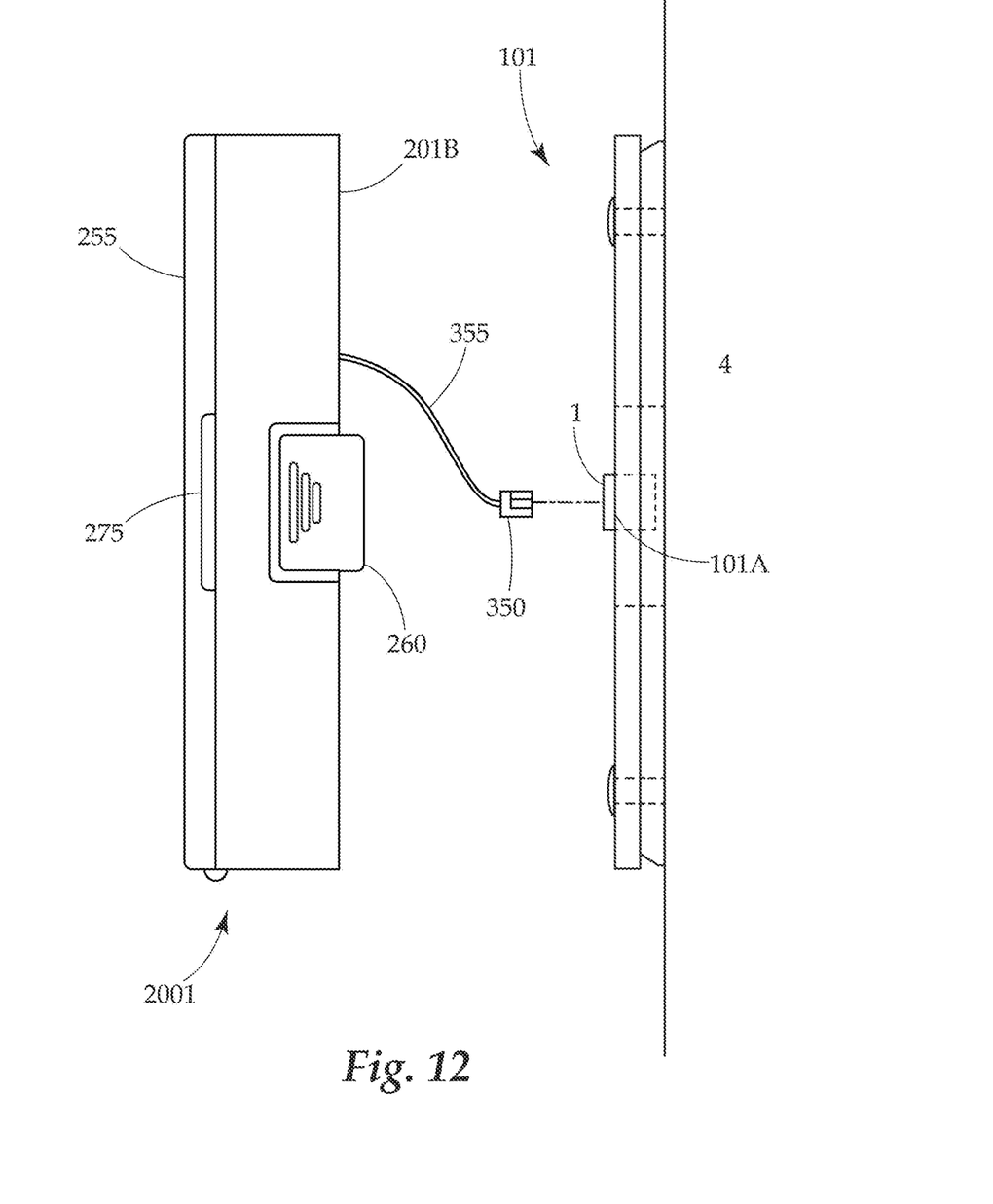
FIG. 12 is a side view of a panic button masking device being connected to a telephone jack in accordance with aspects and embodiments.

Turning now to FIG. 12, which shows a side view of an embodiment of the masking device 2001 being attached to the bracket 101, which is attached to the wall 4. In this embodiment, the telephone plug 350 is connected through and protrudes from the back face 201B of the masking device 2001 by wire 355. In this embodiment, when installed and in operation, the telephone plug 350 is plugged into or connected to the telephone jack 1, and the masking device 2001 is attached to the bracket 101 by side latches 260. In this embodiment, side latches 260 clip onto the edges 101A of the bracket 101. Additionally, in this embodiment, the front cover 255 is transparent, which reveals the panic button 275. However, in other embodiments, the front cover 255 is translucent or completely opaque.

In yet more alternative embodiments, the masking device 2001 may be connected to a wall plate 2 or a junction box 5 without the use of a bracket 101 or 102. In these embodiments, the back cover 290 of the masking device 2001 attaches the masking device 2001 to the wall plate 2 or junction box 5. In some embodiments, the back cover 290 may comprise apertures, wherein the apertures may align with through holes 3B or junction box holes 5B in order for screws 3A, 5A, or 35 to pass through the apertures in the back cover 290 and connect the masking device 2001 to the wall plate 2 or junction box 5. The apertures may be positioned above and below the wire opening 295 of the back cover 290. In other embodiments, the back cover 290 may be attached to a wall plate 2 or a junction box 5 via a hook, mounting fingers, or other similar connection alternatives.

Although certain representative embodiments and advantages have been described in detail, it will be apparent to those skilled in the art that various modifications and variations can be made in the present disclosure without departing from the scope or spirit of the disclosure. Other embodiments of the disclosure will be apparent to those skilled in the art from consideration of the specification and practice of the apparatuses and methods disclosed herein. It is intended that the specification and examples be considered as exemplary only.

What is claimed is:

1. A functional telephone jack masking system comprising:
   a telephone jack and a wall plate, wherein the wall plate has a width, and the wall plate surrounds the telephone jack; and
   a masking device connected to the wall plate, wherein the masking device comprises a panic button;
   wherein the masking device comprises a main body having a front face and a back face, wherein the masking device comprises the panic button on the front face of the main body;
   wherein the front face of the main body comprises grilles positioned above and below the panic button, and the main body further comprises a speaker and a microphone electrically connected to a printed circuit board within the main body of the masking device.

2. The functional telephone jack masking system of claim 1, further comprising a bracket connected to the wall plate, wherein the bracket defines a jack frame, and the telephone jack is accessible through the jack frame when the bracket contacts the wall plate, wherein the masking device is connected to the wall plate by the being connected to the bracket.

3. The functional telephone jack masking system of claim 2, wherein the bracket is connected to the wall plate by at least one of screws or fixing screws.

4. The functional telephone jack masking system of claim 2, wherein the bracket comprises a plate body having a width and a center, wherein the width of the bracket is greater than the width of the wall plate.

5. The functional telephone jack masking system of claim 4, wherein the jack frame is defined in the center of the plate body, and the bracket defines two through holes, wherein one of the two through holes is positioned above the jack frame, and the other one of the two through holes is positioned below the jack frame.

6. The functional telephone jack masking system of claim 5, wherein the bracket is connected to the wall plate by at least one of screws or fixing screws, wherein the at least one of screws or fixing screws passes through the two through holes of the bracket, into a hole defined in the wall plate, and screw into a wall.

7. The functional telephone jack masking system of claim 1, wherein the masking device further comprises a back cover, wherein the back cover of the masking device connects the masking device to the wall plate.

8. The functional telephone jack masking system of claim 1, wherein the masking device comprises a front cover hingedly connected to the masking device.

9. The functional telephone jack masking system of claim 1, wherein the masking device connects to the bracket by the two side latches of the masking device clipping onto the bracket.

10. The functional telephone jack masking system of claim 1, wherein the masking device is operable to call an emergency number when the panic button is pressed.

11. A functional telephone jack masking system comprising:
    a telephone jack and a wall plate, wherein the wall plate has a width, and the wall plate surrounds the telephone jack;
    a bracket comprising a plate body having a front face, a back face, a width, and a center, wherein the bracket defines a jack frame in the center of the plate body, and the bracket defines two through holes, wherein one of the two through holes is positioned above the jack frame, and the other one of the two through holes is positioned below the jack frame;
    wherein the bracket is connected to the wall plate by at least one of screws or fixing screws, wherein the at least one of screws or fixing screws passes through the two through holes of the bracket, into a hole defined in the wall plate, and into a wall, wherein the telephone jack is accessible through the jack frame when the back face of the plate body of the bracket contacts the wall plate;
    a masking device comprising a main body having a front face, wherein the front face of the main body comprises a panic button and a front cover hingedly connected to the masking device;
    wherein the masking device further comprises two side latches, and the masking device is connected to the bracket by the two side latches engaging with the bracket.

12. The functional telephone jack masking system of claim 11, wherein the masking device further comprises a back cover connected to the main body of the masking device and a printed circuit board within the masking device between the back cover and the main body.

13. The functional telephone jack masking system of claim 12, wherein the masking device further comprises grilles on the front face of the main body and a speaker and a microphone electrically connected to a printed circuit board within the masking device.

14. The functional telephone jack masking system of claim 13, wherein the masking device further comprises a telephone plug and a wire, wherein the telephone plug is connected to the wire, and the wire is connected to the printed circuit board with the masking device.

15. The functional telephone jack masking system of claim 14, wherein the back cover of the masking device defines a wire opening, and the wire extends through the wire opening of the back cover and the jack frame of the bracket, which allows the telephone plug to connect to the telephone jack.

16. The functional telephone jack masking system of claim 11, wherein the width of the bracket is greater than the width of the wall plate, the bracket further comprising edges, wherein the two side latches of the masking device engage with the bracket by clipping onto the edges of the bracket.

17. The functional telephone jack masking system of claim 11, wherein the bracket comprises a protuberance, and the protuberance defines an indent, wherein the two side latches of the masking device engage with the bracket by clipping into the indent.

18. The functional telephone jack masking system of claim 11, wherein the panic button comprises text and lighting to illuminate the text.

\* \* \* \* \*